(12) United States Patent
Eshet et al.

(10) Patent No.: US 10,389,780 B2
(45) Date of Patent: Aug. 20, 2019

(54) MANAGED ADAPTIVE STREAMING

(71) Applicants: Amit Eshet, Suwanee, GA (US); Adam Cohen, Ramat Gan (IL); Assav Bar Yaccov, Tel Aviv (IL); Nir Radian, Tel Aviv (IL)

(72) Inventors: Amit Eshet, Suwanee, GA (US); Adam Cohen, Ramat Gan (IL); Assav Bar Yaccov, Tel Aviv (IL); Nir Radian, Tel Aviv (IL)

(73) Assignee: ARRIS Enterprises LLC, Suwanee, GA (US)

( * ) Notice: Subject to any disclaimer, the term of this patent is extended or adjusted under 35 U.S.C. 154(b) by 335 days.

(21) Appl. No.: 13/763,601

(22) Filed: Feb. 8, 2013

(65) Prior Publication Data

US 2013/0297743 A1    Nov. 7, 2013

Related U.S. Application Data

(60) Provisional application No. 61/596,261, filed on Feb. 8, 2012.

(51) Int. Cl.
*H04L 29/06* (2006.01)
(52) U.S. Cl.
CPC .......... *H04L 65/60* (2013.01); *H04L 65/4084* (2013.01); *H04L 65/80* (2013.01)
(58) Field of Classification Search
USPC ....................................................... 709/219
See application file for complete search history.

(56) References Cited

U.S. PATENT DOCUMENTS

| 6,076,166 A * | 6/2000 | Moshfeghi et al. ............... 726/4 |
| 7,266,122 B1 * | 9/2007 | Hogg et al. ............... 370/395.41 |
| 7,694,034 B1 * | 4/2010 | Breau et al. .................... 710/16 |
| 2007/0276954 A1 * | 11/2007 | Chan .................... H04N 21/222 709/231 |
| 2008/0195748 A1 * | 8/2008 | Tierney .................. H04L 29/06 709/232 |
| 2011/0296485 A1 * | 12/2011 | Nilsson et al. ............... 725/114 |
| 2012/0005716 A1 * | 1/2012 | Milne .............. H04N 21/23655 725/148 |
| 2012/0020581 A1 * | 1/2012 | Zarom .......................... 382/233 |
| 2013/0219446 A1 * | 8/2013 | Hefeeda ............... H04L 65/605 725/116 |

\* cited by examiner

*Primary Examiner* — Wing F Chan
*Assistant Examiner* — Leon Y Tseng
(74) *Attorney, Agent, or Firm* — Bart A. Perkins

(57) ABSTRACT

A computer readable medium and a method for bandwidth management, the method may include receiving or generating (a) video entity quality information for multiple sets of video entities, each set of video entities comprises video entities that belong to different versions of a same video stream, (b) user device screen size information for each user device out of multiple users devices, (c) user device profile information for each user out of multiple users, and (d) bandwidth constraints relating to bandwidth available for transmission of selected video entities to the user devices; wherein each user of the multiple users is associated with a user device of the multiple users devices; selecting for each user device a selected video entity based on at least (a) the video entity quality information, (b) the user device screen size information, (c) the requested video profile information, and (d) the bandwidth constraints; and, streaming to the multiple user devices from multiple selected video entities.

13 Claims, 8 Drawing Sheets

| |
|---|
| Calculating a set of quality of experience factors for each combination of user device and set of video entities; wherein each quality of experience factor is responsive to (a) video entity information related to each video entity of the set, (b) user screen device information related to the user device and (c) user device profile information indicative of a video profile supported by the user device. 621 |
| Selecting for each user device the selected video entity based upon a set of quality of experience factors associated with the user. 622 |
| Selecting, for a first user of the multiple users, a selected video entity based upon a set of quality of experience factors associated with the first user and sets of quality of experience factors associated with other users. 623 |
| Selecting, for the first user, the selected video entity such as to reduce a difference between a quality of experience factor associated the selected video entity to be sent to the first user and a quality of experience factor associated with another selected video entity to be sent to another user. 624 |
| Selecting, for the first user, the selected video entity such as to reduce a difference between quality of experience factor associated with a selected video entity to be sent to the first user and at least one quality of experience factor associated with another selected video entity that was already sent to the first user. 625 |
| Selecting, for the first user, the selected video entity such as to reduce a difference between quality of experience factors associated with different video entity to be sent to the first user at different points in time. 626 |
| Calculating the quality of experience factor based on a peak signal to noise ration (PSNR) and angular pixel density. 627 |
| Simulating (a) multiple selections iterations of selected video entities to be transmitted to the multiple of users and (b) transmissions of the selected video entities to the multiple users, during a future period of time. 628 |
| Calculating a set of quality of experience factors for each combination of user device and set of video entities; wherein each quality of experience factor is responsive to (a) video entity information related to each video entity of the set, (b) user screen device information related to the user device and (c) user device profile information indicative of a video profile supported by the user device. 629 |
| Selecting a quality experience factor of a set of quality experience factors such as to guarantee that a user device receives selected video entities having the selected quality of experience factor without an occurrence of an overflow or an underflow during a future period of time. 630 |
| Evaluating a possibility of an occurrence of the overflow and the underflow during the future period of time while taking into account (a) statistical multiplexing applied on selected media entities aimed to be transmitted to the multiple users and (b) estimated network constraints to exist during the future period of time. 631 |
| Selecting quality of experience factors of user devices that share a same network link based upon bandwidth constraints applicable to the network link. 632 |

MANAGED ADAPTIVE STREAMING

CROSS-REFERENCE TO RELATED APPLICATIONS

This application is a non-provisional of and claims priority to the filing date of U.S. Provisional Patent Application Ser. No. 61/596,261, entitled "Managed Adaptive Streaming," filed Feb. 8, 2012, which is hereby incorporated by reference as if set forth herein in its entirety.

TECHNICAL FIELD

The disclosure relates to transmission of video streams over Internet protocol (IP) networks. More specifically, it relates to transmission of rate adaptive video streams over managed IP networks.

BACKGROUND

Internet Video

Over that past few years, the technology for streaming video over the internet has developed rapidly. Among these developments are: Increased available bandwidth both wired and wireless, available to the user and new mobile devices introduced to the market, capable of displaying high quality video These developments resulted in a state where the internet traffic is dominated by video streaming. The traditional method, of fully downloading a file prior to viewing it, results in a long delay between the request and the viewing and does not facilitate live video distribution. This state introduced a demand for instant viewing methods, in order to provide TV-like viewing experience.

Streaming Over UDP

User Datagram Protocol (UDP) was the first transport protocol used to stream video over an Internet protocol (IP) networks. Due to the real-time nature of video applications, the choice of the stateless UDP protocol was natural. The reliability advantage of the Transmission Control Protocol (TCP) was considered useless when delivering video, since the retransmitted data may arrive following its display time, in which case the retransmission was useless. The stateless nature of UDP enabled simultaneous serving of multiple user devices, using Multicast transmission.

Streaming of video over UDP is done primarily using real-time transport protocol (RTP) and real time streaming protocol (RTSP). These protocols typically enable playback functionalities such as Play, Pause, Rewind, Fast Forward, Record, etc. However, since UDP is not a native protocol of the internet, network firewalls and network address translation (NAT) devices block UDP streams by default and legacy proxy and cache servers did not function on UDP streams Another shortage of this approach, using multicast transmission, is the fact that the same stream is being sent to all user devices. This results in packet drops in scenarios where the video stream bit rate was higher than the bit rate available for the user device. This, in turn, results in video streams that were not viewed properly by the user device.

These difficulties yielded the introduction of a streaming method which is based on the hypertext transfer protocol (HTTP) and transfer control protocol (TCP) protocols, which are native to the internet environment.

Progressive Download

Progressive Download, is a method where video is transferred to the user device as a file using the HTTP application layer protocol. As soon as enough video is received at the user device, it starts playing the video. Progressive download faces various problems, some which are illustrated below.

Insufficient Available Bandwidth

There are scenarios where the available bandwidth on a link between the video server and the user device is lower than the video stream BW. In such scenarios, the video will not be downloaded fast enough and as a result the user device will be starved resulting in intermittent stops in playback.

Fluctuations in the Available Bandwidth

The network connecting the server and the user device typically includes many links between routers, each having a different available bandwidth. The number of users sharing each link is large and varies over time. WiFi links, which are typically the last hop in the route, may exhibit drops in available bandwidth.

The aforementioned results in fluctuations in the available bandwidth for the session. In a scenario where the link bandwidth fluctuates over time the user may experience problems even though the average link bandwidth is higher than the nominal stream bandwidth. This may result due to local minimum in the link bandwidth which will not enable a continuous streaming.

Fluctuations in Video Encoding Bit-Rate (Variable Bit Rate (VBR) Stream)

The video encoder may encode different parts of the video stream in different bit-rates. This happen can locally, on a scale of a few seconds, even in case the encoder was configured to output a VBR stream. During periods when the encoded video bit-rate is higher than the average, it is possible that the available bit-rate for the user device is insufficient for continuous playback. In such a case the playback will freeze, even though on average the bit-rate available for the user device is sufficient for the video.

The Available Bandwidth is Too High

When the available bandwidth between the server and the user device is higher than the nominal stream bandwidth, video data is accumulated at the user device's video playback buffer. If the user device stops the video playback before the entire stream is played, all the accumulated data at the playback buffer is discarded without being watched. However, downloading data that will not be used is a waste of network resources.

Start/Seek Time

When a user device requests a certain remote video asset, the video playback does not start upon the arrival of the first video byte to the user device. Rather, the video playback is delayed, in order to allow accumulation of video playback buffer at the user device. This delay also occurs when the user device seeks forward or backward in the movie and its previously transmitted data becomes irrelevant. This delay has a typical length of several seconds, and it degrades the user experience.

TCP Utilization

The most common link layer protocol for video transmission over the Internet is TCP. The TCP protocol dynamically attempts to estimate the link's parameters (BW, Round Trip Time (RTT)) and adjust its transmission accordingly. It also attempts to share the available bandwidth evenly between TCP user devices. This probing functionality has a cost in term of transmission efficiency. As a result, a sender that knows exactly the available bandwidth for the stream may better utilize the link. An example for this under-utilization can be seen in Wang's work (B. Wang, 2004, "Multimedia Streaming via TCP: An Analytic Performance Study"), stating that good streaming of video over TCP requires available bandwidth of twice the mediaBW.

Improvements to Progressive Download

Despite much inefficiency, the progressive download method gained popularity and became the streaming approach of choice for many content providers. The attempts to solve its problems are presented here.

Caching

A content delivery network (CDN) is a network of caching proxy servers. Ideally, a caching server will be located as close as possible to the user device. A CDN shortens the distance between the user device and the server, resulting in a wider channel with less bandwidth fluctuation. However, the solution for the bandwidth problems is only partial, since the route between the user device and the proxy server may still exhibit problems of insufficient or fluctuating bandwidth.

Bit Rate Throttling

Bit rate throttling is a feature in a video streaming server that controls the rate in which data is being transmitted to the user. The video streaming server analyzes the video file sent to the user, determines its encoding bit rate, and sets its transmission bit rate accordingly. When a new user starts receiving video, the video streaming server sets the transmission bit rate to be higher than the encoding bit rate, in order to reduce the startup delay at the user device.

The above solutions attempt to address the problem of having too much available bandwidth, and also attempt to improve start/seek delay.

Adaptive Bit-Rate (ABR)

ABR is a method that enables each user device to receive the appropriate video, according to its available bandwidth. The video is encoded in several versions, each in a different bit-rate. The user device senses the available bandwidth, and selects the appropriate version accordingly.

Using ABR, each version of the stream is encoded in segments. A segment is a part of the stream that can be concatenated to its subsequent segment from a different version in a way which appears seamless to the player. Segment duration is typically 2-10 seconds.

An adaptive streaming user device measures its available bandwidth and playback buffer state, and according to those inputs requests the segment of the appropriate version.

The ABR method attempts to resolve the problem of having too little and too much bandwidth, as well as addressing fluctuation in bandwidth. ABR also improves the start/seek delay by selecting versions with smaller sizes when the playback buffer is low. However, ABR also creates a new quality of experience (QoE) problem, whereby the quality of the received stream is inconsistent.

As described in the previous paragraph, TCP connections share the bandwidth equally. But equal bandwidth does not mean equal video quality, as in the following example:

Two user devices are sharing the same channel of 4 mbps. One is a HD TV, whose video is encoded in the following versions: HIGH—4 mbps, MED—3 mbps, LOW—2 mbps. The other is a smartphone, with a lower screen resolution, whose video has the following versions: HIGH—2 mbps, MED—1 mbps, LOW—0.5 mbps.

The TCP associated with each user device will attempt to achieve an equal share of the channel's bandwidth, thus each user device will be allocated 2 mbps. In this example, the smartphone will experience a high video quality, while the HD TV will suffer from a low video quality.

Inequality in the QoE (or video quality) can occur when all user devices are using the same device as well. For example, when encoding a video sequence, the encoder may require more bits for complex scenes than to a simple scene. In a scenario where one user device watches a complex scene, which requires high bit rate for a certain quality, and another user device watches a simple scene, which requires a lower bit rate for the same quality, the TCP, being oblivious to video quality, will receive equal bandwidth for both user devices, hence causing video quality inequality.

Adjustable bit rate (ABR) attempts to solve the problems of fluctuating available bandwidth and fluctuating video encoding bit-rate, but does so based only on data received at the user device, which produces limited results comparing to the proposed solution.

BRIEF DESCRIPTION OF THE DRAWINGS

The subject matter regarded as the invention is particularly pointed out and distinctly claimed in the concluding portion of the specification. Various aspects of the disclosure, however, both as to organization and method of operation, together with objects, features, and advantages thereof, may best be understood by reference to the following detailed description when read with the accompanying drawings in which:

FIG. 7 illustrates a stage of the method of FIG. 6 according to various embodiments of the disclosure.

Like reference numbers and designations in the various drawings indicate like elements.

DETAILED DESCRIPTION

Figure 1:
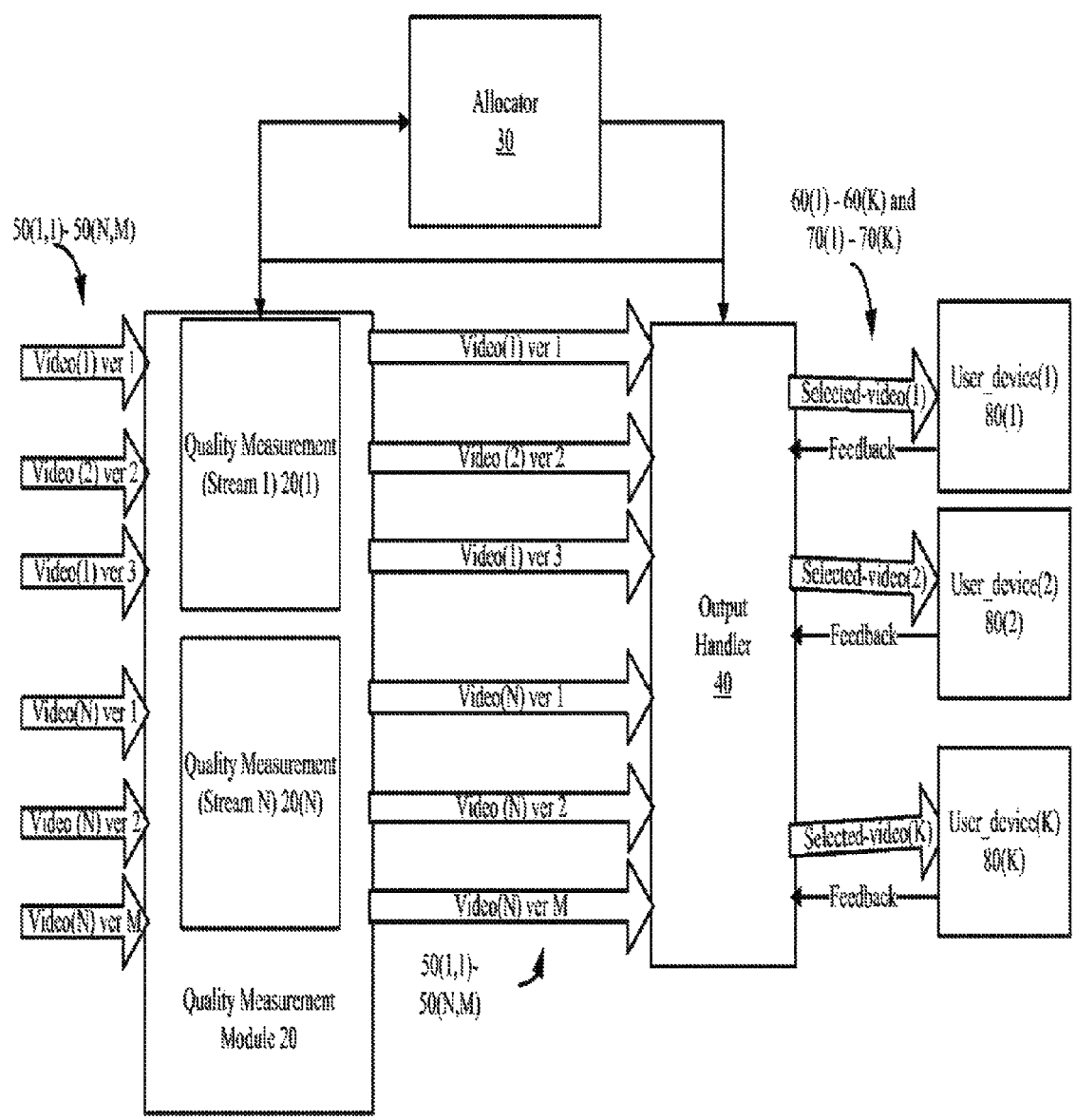
FIG. 1 illustrates a system according to an embodiment of the disclosure.

There are provided methods, systems and computer readable mediums for rate adaptive video streaming.

It is noted that any reference in the specification to a method, to a system or to a computer readable medium should be interpreted as being applicable to each one of the system, the method and the computer readable medium. For example, a reference to a method should be interpreted as being also aimed, where applicable, to a system and to a computer readable medium. Thus, the method can be executed by a corresponding system. Additionally, instructions stored in the computer readable medium may cause a computerized system to execute various methods disclosed herein.

In most adaptive streaming methods, the user device (or client hosted by a user device) may select the video version it downloads. Various implementations can include a system that selects the version of each video segment to be transmitted to each user device. The network device is aware of all the user devices sharing the network, and of the video quality of each video segment. This added information facilitates smarter decisions regarding the available bandwidth (BW) for each user device and the version of the video segment to be sent to each user device. These decisions can improve the overall quality of experience (QoE), reduce start delays and alleviate network congestions and underutilization.

The system can have a centralized architecture and can control bandwidth and QoE. The system, method and computer readable medium can consider the available bandwidth over the entire network, the temporal video quality of the video streams, the properties of the user devices and the playback buffer state in each of the user devices in order to provide an efficient resource allocation.

In some implementations, the system can allocate more bandwidth for high profiles and big screens in order to optimize the overall QoE of the lineup. Thus, the system can apply logic to differentiate bandwidth according to the user device properties. Additionally, the system can differentiate screen size and profile (like SD, HD and 3D).

In other implementations, the system can optimize lineup and session QoE by quality shaping. The system can aim for a uniform quality over time and across sessions. This allows increasing the quality and saving bandwidth relatively to other adaptive streaming solutions. For example, the system, method and computer readable medium avoids areas where the video quality is bad by selection of high quality and bit rate versions. It compensate for the extra bandwidth in another areas or session where the actual quality of the lower versions is good enough.

The system can also facilitate increased density by optimizing QoE in the user devices and network resource utilization of the devices. Thus, the system facilitates an increased number of user devices being served over a given network.

In some implementations, the system can optimize the QoE given an inconsistent QoS in the home network. For example, the system can reduce the user device's tuning delay (start latency) by providing more bandwidth to new user devices and a smart version selection.

FIG. 1 illustrates a system 10, including a quality measurement module 20, an allocator 30 and an output handler 40. Each one of the measurement module 20, allocator 40 and output handler 40 can include hardware components or can be executed (or hosted) by a server or other computerized entity that includes hardware components. For example, each of these modules 20, 30, 40 can be a server that is equipped with software, middleware or any type of code that allows the server to operate as a quality measurement module, allocator or output handler.

For simplicity of explanation FIG. 1 illustrates N video input video streams (each is represented by one or more versions), K user devices 80(1)-80(K), three versions of a first video stream 50(1, 1,)-50(1,3) and M versions of the Nth video stream (50(N, 1)-50 (N, M).

It is noted that K can equal N (e.g., when each user device receives a different video stream), K can be bigger than (e.g., when at least two different user devices receive the same video stream), and K can be smaller the N (e.g., when the quality measurement module receives and evaluates the quality of more video streams than then number of user devices). For brevity of explanation there are illustrated three versions of the first video stream 50(1, 1)-50(1, 3) but the number of versions may differ from three.

In some implementations, the quality measurement module 20 can calculate the quality of input media streams quality by analyzing their properties. The quality measurement module 20 of FIG. 1 is illustrated as having a separate quality measurement modules 20(1)-20(N) for each media stream but this is not necessarily in all implementations.

FIG. 1 illustrates all media streams 50(1, 1)-50(N, M) that are analyzed by quality measurement module 20 to be sent to output handler 40. However, in other implementations, the media streams are not necessarily sent to the output handler 40. For each video stream to be streamed to a user device, the output handler 40 can select the appropriate (selected) video stream 60(1)-60(K). In some implementations, the output handler 40 can receive feedback 70(1)-70(K) from the user devices.

The allocator 30 can identify user device properties and quality metadata, and can identify the video version to be provided to the user device and can allocate a transmission bit rate to the stream. The output handler 40 can send the selected version of the media stream to the user device at the allocated bit rate. In some implementations, the output handler 40 can sense the properties of the network (such as available bandwidth in each link), and can provide feedback to the allocator 30. The feedback can include the network properties along with statistics associated with transmitted data.

Quality Measurement

In some implementations, the quality measurement module 20 can calculate the video quality over a specified period of video frames. The period of time may be variable or constant and can depend on configuration, Group of Picture (GOP) structure, segments length and movie length.

In some implementations, the quality measurement can be applied per a "switch unit" as the basic block for quality measurement. A switch unit is the smallest unit of media that can be seamlessly concatenated between different versions or can be processed to do so. For example every synchronized closed GOP is a switch unit. This differs from the existing adaptive streaming technologies in which user devices request different video versions in resolution of segments, which may consist of several switch units. As part of the disclosed managed adaptive streaming solution this atomic switch unit can be used as a segment, thus increasing granularity, which in turn results in improved efficiency.

In some implementations, the quality measurement module 20 can use higher quality video version or the source video as a reference for quality measurement. If a good quality version is not available, the quality measurement can use a non-reference model whereby the video quality is estimated without using a reference. The quality calculation can be optimized for increased correlation with subjective video impression (such as mean opinion score (MOS)). The quality measurement module 20 can use mean square error, peak signal to noise ratio (PSNR), structural similarity or any other metric for reference or non-reference model.

In various implementations, the input for the quality measurement module 20 can be provided in either real-time or offline. For offline processing, more tools can be used to offer better correlation to the subjective quality.

The quality measurement module 20 can operate in various modes. A first mode can operate in the uncompressed domain after the relevant video period was decoded. This mode offers a better correlation to the subjective video quality. Another alternative is compressed domain analysis using parameters such as the qscale, motion vector and coefficients.

A second mode can operate in a compressed domain. The compressed domain can provide higher density and lower cost, because it avoids the decoding process. This mode may have specific flavors per codec (like H.264, MPEG2 or VC1), because different codec have different parameters in the encoded domain. A basic approach for video quality estimation can work on the encoding parameters such as average bit rate and resolution. This type of measurement loses temporal and session video quality differentiation, however it facilitates screen and profile differentiation (e.g. small screens gets a proportional share of the bandwidth). This mode does not require video processing, since the video quality can be performed on metadata or manifest files. Moreover, in instances where the input is encoded with constant quality, video quality differentiation can be maintained.

Finally, the quality measurement module 20 may apply a hybrid mode, where some content is measured in the compressed domain and some content is measured in the uncompressed domain or without video processing at all, according to performance and viewing statistics.

The quality measurement module 20 may normalize its grade to user device's profile (such as SD\HD\3D), and screen size (mobile, tablet and TV).

PSNR Normalization

Figure 2A:
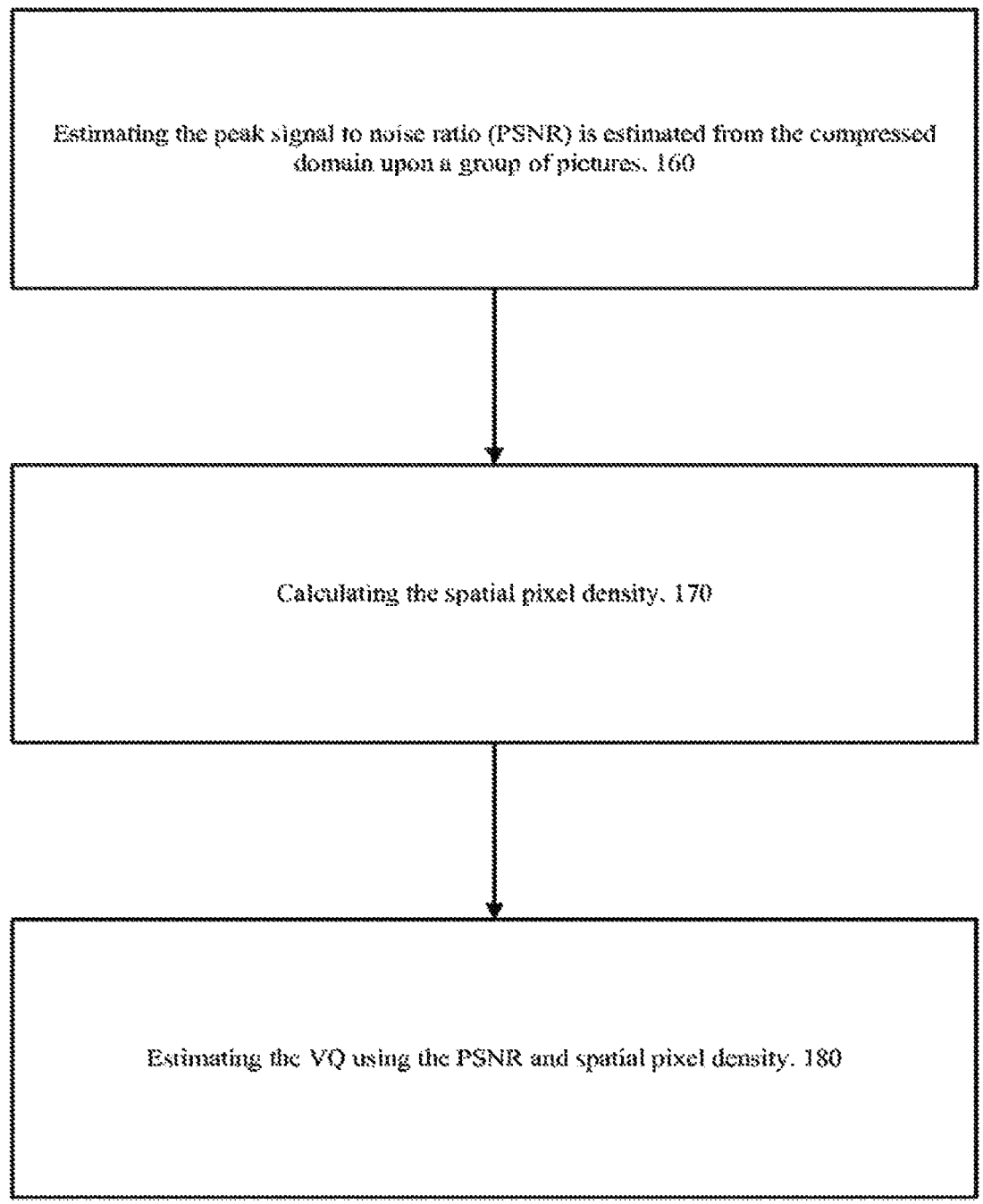
FIG. 2A illustrates a method for estimation of the video quality (VQ) from compressed video according to an embodiment of the disclosure.

FIG. 2A illustrates a method 150 for estimation of the video quality (VQ) from compressed H.264 video according to an embodiment of the invention. Process 150 can operate to estimate the VQ using the compressed video parameters and edge device specifications. The process 150 does not decode the compressed stream and does not require a reference stream. The VQ estimation can be referred to as a two stage process.

The process 150 starts at stage 160 by estimating the peak signal to noise ratio (PSNR) is estimated from the compressed domain upon a group of pictures. The PSNR estimation can be based on the quantization parameters (QP) and introduces linear complexity in its basic form which provides an estimated PSNR (see equation 1). The current PSNR estimator can be further refined or upgraded to detect other effects (e.g. pumping effect). The current PSNR estimator is not an encoder, edge device or bit rate sensitive. The term E[QP OF GROUP OF IMAGES] denotes the average QP over a certain video segment that includes the group of images.

$$PSNR = \alpha_1 \cdot E[QP \text{ of a group of images}] + \beta_1 \quad \text{(eq. 1)}$$

Stage 160 is followed by stage 170 where the spatial pixel density is calculated. Spatial pixel density refers to the pixel density for 1° of viewing angle. In contrast to the PSNR estimation, the spatial pixel density is directly affected by the edge device characteristic: display size and native resolution, displayed stream resolution, viewing distance and human eye discrimination ability. It is assumed that the displayed stream is scaled up/down to fit the edge device display size and resolution while maintaining its original aspect ratio.

At stage 180 the VQ is estimated using the PSNR and calculated spatial pixel density. Stage 180 can include calculating the video quality (VQ) given the PSNR and angular pixel density by calculating equation 2:

$$VQ = \alpha_2 \cdot PSNR + \beta_2 \cdot \text{angular pixel density} + \gamma_2 \quad \text{(eq. 2)}$$

There may also be additional parameters which affect the video quality such as the edge device quality (black-levels, color Temperatures, brightness, dynamic Range, contrast, color, viewing Angles etc.). These parameters are ignored at the moment since they introduce minor modulations to the current VQ estimator. In addition, the VQ for new edge devices with new native resolutions and display sizes can be interpolated using the introduced method.

Both the PSNR and VQ estimators were validated against subjective tests by a group of video quality experts across different encoders, edge devices and stream types.

Figure 2B:
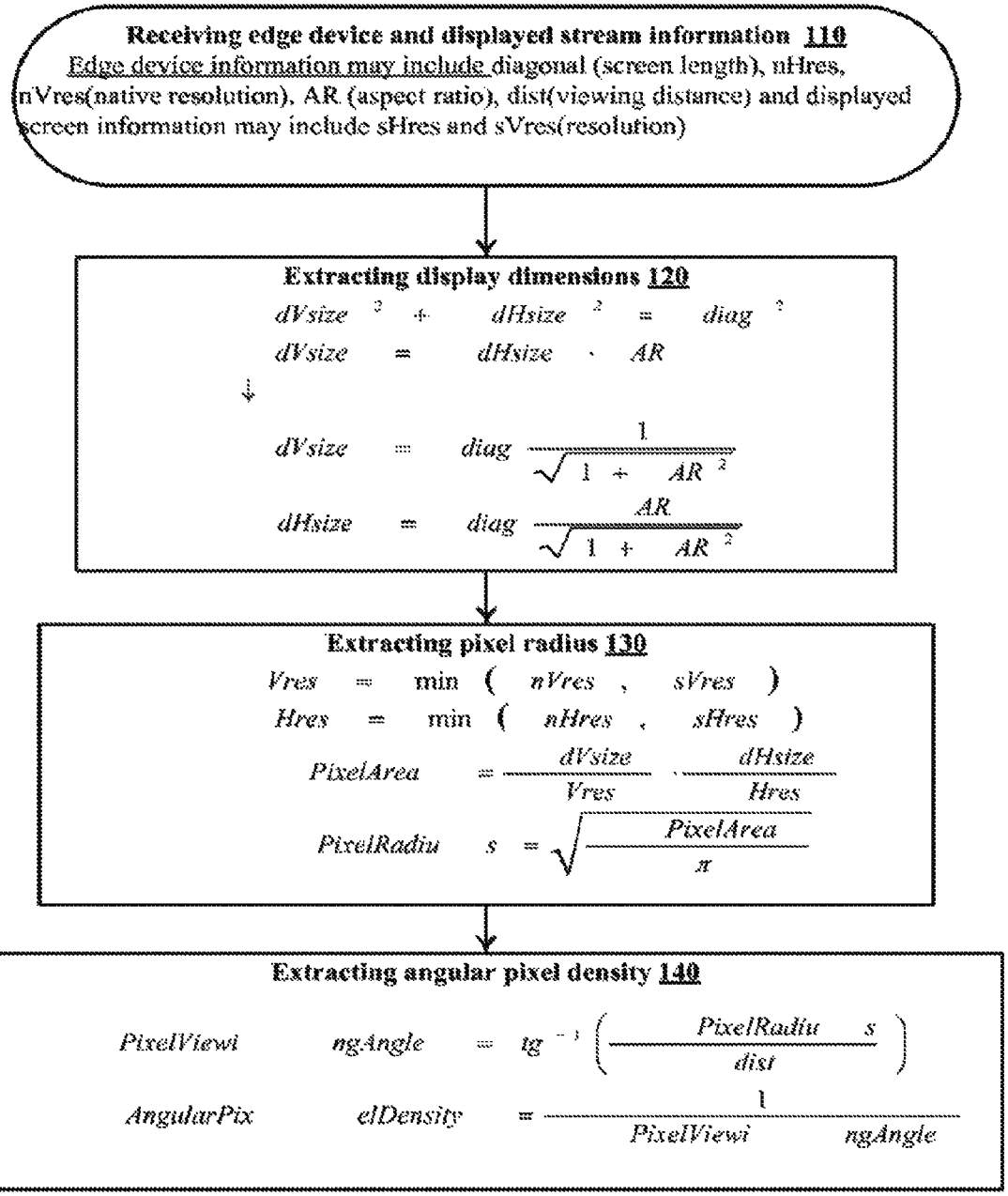
FIG. 2B illustrates a stage of the method of FIG. 2A according to an embodiment of the disclosure.

FIG. 2B illustrates an implementation of stage 170 of FIG. 2A. Stage 170 may start at stage 110 of receiving edge device and displayed stream information. Edge device information may include diagonal (screen length), nHres, nVres (native resolution), AR (aspect ratio), dist (viewing distance) and displayed screen information may include sHres and sVres (resolution).

Stage 110 can be followed by stage 120 where display dimensions are extracted. Extracting display dimensions can include calculating the following equations:

$$dVsize^2 + dHsize^2 = diag^2$$

$$dVsize = dHsize \cdot AR$$

$$dVsize = diag \frac{1}{\sqrt{1+AR^2}}$$

$$dHsize = diag \frac{AR}{\sqrt{1+AR^2}}$$

Stage 120 can be followed by stage 130, where pixel radius is extracted. Extracting pixel radius can include calculating the following equations:

$$Vres = \min(nVres, sVres)$$

$$Hres = \min(nHres, sHres)$$

$$PixelArea = \frac{dVsize}{Vres} \cdot \frac{dHsize}{Hres}$$

$$PixelRadius = \sqrt{\frac{PixelArea}{\pi}}$$

Stage 130 can be followed by stage 140 where angular pixel density is extracted. Extracting angular pixel density can include calculating the following equations:

$$PixelViewingAngle = tg^{-1}\left(\frac{PixelRadius}{dist}\right)$$

$$AngularPixelDensity = \frac{1}{PixelViewingAngle}$$

There can be at least two methods for profile and screen normalization separated and unified. Separated profile and screen normalization can measure video quality independently for the profile and screen. A second module can normalize the raw video quality and the user device type into a normalized video quality value. These modules can be more efficient if a certain stream served a few profiles, because the raw video quality measurement is performed for a single instance.

Figure 3A:
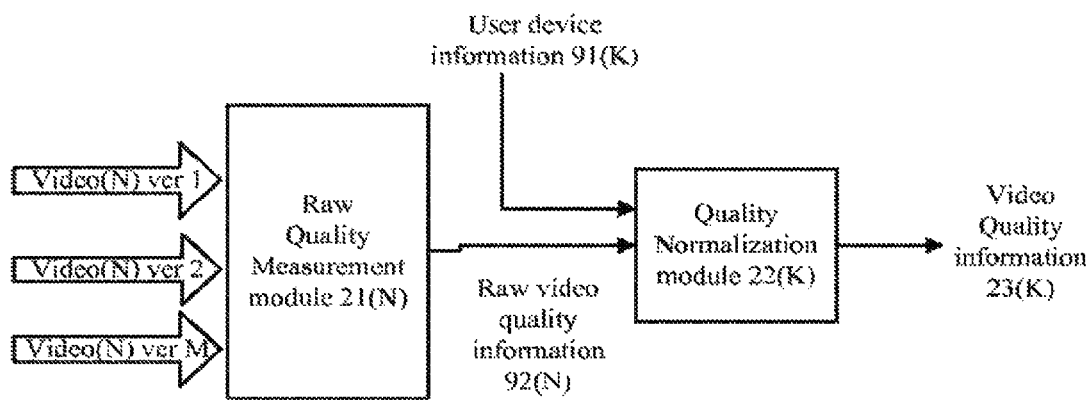
FIG. 3A-3B illustrate quality calculations according to various embodiments of the disclosure.

This scenario is illustrated in FIG. 3A, where a video stream (such as M versions of video stream N) is sent to a raw quality measurement module 21(N) and outputs raw video quality information 92(N). It is assumed that this video stream should be sent to the Kth user device. Accordingly, the raw video quality information 92(N) and the Kth user device information 91(K) (screen size, profile of video supported by the user device) are sent to quality normalization module 22(K) that outputs video quality information 23(K).

In a unified profile and screen normalization process, the normalized video quality is calculated directly for the video data and the user device type. This method offers a better correlation to the subjective quality, but the results are designated only for one profile type.

Figure 3B:
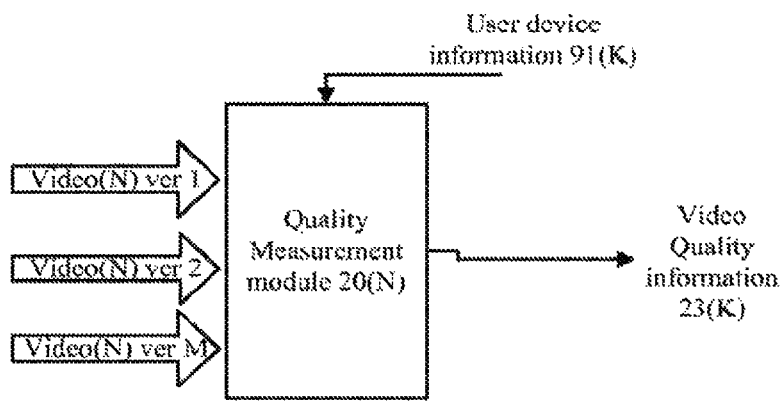

This scenario is illustrated in FIG. 3B where a video stream (such as M versions of video stream N) and the Kth user device information 91(K) (screen size, profile of video supported by the user device) are sent to quality measurement module 20(N) that outputs video quality information 23(K).

A central management system can offer automatic selection to different mode and methods of operation based on user configuration, available resources, priority, use-case, session rating and the effect of the bandwidth utilization.

Quality Measurement and Encryption

In various implementations, the system can provide different approaches for quality measurement and digital rights management (DRM) (e.g., encryption): Perform Quality measurement before encryption; Decryption and encryption and Working in the encrypted domain.

Perform Quality Measurement Before Encryption

In a scenario where the quality measurements take place prior to encryption, the stream can undergo encryption immediately following the quality measurement. The encryption can be performed on the same machine or in a different machine than the quality measurement.

Decryption and Encryption

In a scenario where the encryption takes place prior to the quality measurements, the decryption keys can be used to decrypt the data, retrieve the metadata, and re-encrypt the data. This process is scalable because the decryption and encryption are performed once per stream.

Working in the Encrypted Domain

In a scenario where the encryption takes place prior to the quality measurements, and decryption is not practical, the quality measurements can rely on parameters which are not affected by the encryption. In these scenarios it can be assumed that the VQ complies with the public recommended encoding settings for HTTP live streaming of media. More specifically, there are recommended bit-rate values for encoding streams for different devices, and desired video quality. Using these values, the average video quality of a given input stream is interpolated. Hence, a coarse VQ estimation is also available in these scenarios.

Metadata Delivery

Metadata is compiled containing all required information for proper version selection and statistical multiplexing that is done by the allocator. Delivery of the metadata to the allocator is provided in cases where the system is deployed in a distributed architecture, where the quality measurement module does not reside in the same place as the rest of the system. Five possible delivery methods are listed below.

In one delivery method the metadata can be embedded into the content using mechanisms offered by the container format. For example, when media content is encapsulated in MPEG-Transport-Stream, metadata may be embedded as transport_private_data within the adaptation field. Unlike traditional SPTS encryption, some encryption protocols encrypt all the data as a file, usually using a CBC. In this case the metadata can be inserted at the beginning of the file such that metadata is available by decryption of a small portion of the segment.

In another delivery method, the metadata can be added into the manifest files. In Apple HLS, for example, metadata can be added to the .m3u8 playlists using the '#' comment syntax which would be ignored by all other entities except the allocator.

In a third delivery method, new segments can be interleaved into the existing playlist of a single variant containing only metadata. In a fourth delivery method, a new variant of the stream can be added that contains segments containing only metadata. In a fifth delivery method, live content metadata can be sent over an out of band connection from the quality measurement module to the allocator.

Allocator

The allocator 30 of FIG. 1 controls the quality of video that user devices download and the transmission bit rate in which user devices download the video data. The allocator 30 serves user devices that are connected to a network of any topology. Generally, each user device has a limited bandwidth and any group of user devices may share a channel with a limited bandwidth.

An example for a network is the cable DOCSIS environment where multiple cable modems are connected to a cable modem termination system (CMTS) and share a channel with limited bandwidth B. Each cable modem may be connected to a home router which serves multiple user devices. Furthermore, each cable modem is limited to a bandwidth B. For example, user devices A and B may be connected to a home router that is connected to cable modem. User devices A and B share the bandwidth denoted by B. User device C may be connected to a home router under cable modem. User devices A, B and C, therefore, share the bandwidth denoted by B.

The goals of the allocator 30 can be: (i) Maximize bandwidth utilization, hence increase video playback session density and (ii) Maintain equal Quality of Experience for all sessions that is optimal and constant over time.

Bandwidth utilization of a link is defined as the ratio of the transfer rate of video payload viewed by the user device to the channel BW.

Some Quality of Experience (QoE) factors are listed below.

Average Received Video Quality (ARVQ)

The VQ a user device receives can be a weighted average of quality grades given to GOPs by the tools mentioned above. The simplest weighted average, for example, can be the average VQ of all GOPs received until a certain time.

Video Quality Changes

Switching between video versions with significantly different ARVG could cause visible artifacts and degrade VQ and thus QoE.

Cessation of Playback

Playback is stopped when there isn't enough video playback in the user device's buffer and is continued after user device has buffered sufficient data.

Start/Seek Times

Experience of user can be affected by the amount of time playback commences after a Start/Seek request.

Potential problems that are addressed by the allocator can include fluctuation in bandwidth availability, variability of video bit rate over time, and variability of video quality over time User Information In the process of deciding on allocations, the allocator can use information which may not be available in the existing ABR technologies: VQ and size measurements, future transmission simulation, network information, additional user and User device Playback Buffer.

VQ and Size Measurements

As described in the previous section, video quality measurements are performed on the input, which enables the allocator to make decisions based on that data. In existing ABR, only the size of the segments is available, which is not closely related to the actual video quality.

Future Transmission Simulation

In existing ABR technologies, the decisions are made by the user device, and can be based only on information received on the user device side. In the proposed system, method and computer readable medium, however, there is additional data available: all the data that resides in the system, but not yet sent to the user device. This data can be used in order to simulate future transmission to the user device, and react to changing input conditions (for example, increase in segment size) even before this change is reflected to the user. This early response can in many cases produce a better result in terms of QoE, as explained below.

Network Information

Existing ABR technologies use TCP to sense the available bit-rate for the session. This sensing results in a state where roughly 90% of the bit-rate available for the session is in fact used. In the proposed system, method and computer readable medium the link capacity can be configured or known precisely, hence its utilization is optimal.

Information regarding network topology and resources may be available to the allocator via one or more of the following methods.

The allocator can receive a configuration from a separate configuration entity. This configuration can include the network topology and available bandwidths per home router and per channel. The bandwidths published to the allocator through this method may be upper bounds or tight.

The allocator can receive network information from the output handling. This information may include bandwidth availability to specific user devices that reside behind a home router, bandwidth availability to a home router, and bandwidth availability that is shared between many home routers. The method with which this information may be gathered includes, but it not limited to, the following: TCP congestion control feedback, An inline system where all traffic in the system passes through the output handling, and can be calculated or a Query of network entities such as routers using existing protocols such as SNMP.

Additional Users

Existing ABR technologies have distributed control on the user device side. In the disclosed system, method and computer readable medium the control is centralized in the server size. This implies that the controlling entity (the allocator) is aware of all the users sharing the network resources, and can handle the cross-effects between the users more efficiently. This extra information has an effect especially when users are joining or leaving the system, and the allocated bit-rate for the existing users has to change.

User Device Playback Buffer

The user device playback buffer is available in existing ABR technologies where the control is on the user device side, but is also available in the disclosed system, method and computer readable medium by monitoring the data transmitted to the user device.

When segments are received at the user device, they are not sent to playback instantly, but rather stored in a buffer at the user device until their playback time. This buffer will be referred to here as the user device playback buffer, or CPB. Knowing the CPB state of the user device can assist the allocator in making its decision.

Example: Suppose a user device receives video segments via a channel of 2 Mbps. Each video segment is of size 1 Mbit, and playback duration of 1 second. A new segment enters the CPB every 0.5 s, at times: 0.5 s, 1 s, 1.5 s, 2 s, and so on. The user device commences playback as soon as the first segment is received. Each second, one segment is removed from the CPB for playback, at times: 0.5 s, 1.5 s, 2.5 s, and so on. After 5 seconds of transmission, 10 segments have entered the CPB and 4 removed, which means that 6 segments, or 6 seconds of playback, have accumulated in the CPB.

The allocator can have information of the CPB state at any point. In some protocols or proprietary user devices, the user devices can send its playback buffer state and no calculation is needed. However it is not always possible to get the playback buffer directly from the user device. It can be proposed a method to estimate the playback buffer size. It can be assumed that the user device HTTP get or equivalent request that indicates the user device's current position in playback. The current playback buffer size is the transmitted data minus the playback start time. The playback start time can be experimentally determined for each user device type, where a common practice is starting the playback after the first video segment has arrived (which can be used as the "default" value). A skip or seek request can be identified by a discontinuity in the request. Delayed user device request times (i.e. requests arrive later than expected) can indicate playback buffer fullness or that that user has paused playback.

The system can apply two complementary methods which may overcome the mentioned above problems version selection and statistical multiplexing. Version Selection includes choosing between video versions that are sent to a user device, that differ in bit rate and quality, and by statistical multiplexing it refers to the act of dividing the available bandwidth of a shared link among several user devices by allocating variable transmission bit rates to each user device. Decisions are based upon metadata compiled by the quality measurement module. Metadata is acquired according to the chosen delivery method. If content is encrypted, then the content may undergo partial decryption for the sake of the inband metadata only. The allocator is agnostic to the video encoding and can act upon the metadata.

Version Selection

The video version allocated per user device can change in resolution of segments. Version Selection can be used to ensure equal ARVQ among user devices by employing the following strategy: For each user device being served, the allocator will calculate the ARVQ for a specific time period, for each version of video available to user device, i.e. for a time period T for each user device i that has a vector of n available versions ($V_i^1$, $V_i^2$, . . . ), there will be a vector of calculated ARVQs ($Q_i^1$, $Q_i^2$, . . . ). The allocator will then find the maximum ARVQ grade that all user devices can receive, within the limits of the channel constraints.

For example, two user devices share a 6 Mbps channel and are downloading different video sequences each having high and low bit rate versions. User device A may receive either a 3 Mbps video with an ARVQ grade of 6, or a 4 Mbps video with an ARVQ grade of 8. User device B may receive a 2 Mbps video with an ARVQ grade of 8 or a 3 Mbps video with an ARVQ grade of 9. In order for the ARVQ grades to be equal, the allocator may allocate 4 Mbps to User device, and select the 4 Mbps video and allocate 2 Mbps to user device B and select the 2 Mbps video, consequentially both user devices will receive an ARVQ grade of 8.

|                    | User device A    |      | User device B    |      |
|--------------------|------------------|------|------------------|------|
| Available Versions | Bit rate (MBPS)  | ARVQ | Bit rate (MBPS)  | ARVQ |
| Low Version        | 3                | 6    | 2                | 8    |
| High Version       | 4                | 8    | 3                | 9    |

Version selection can be used to ensure constant ARVQ by overcoming variable video quality. For example: Video version $V_1$ may have an ARVQ of 6 during time period $T_1$, and an ARVQ of 7 during time $T_2$. Video version $V_2$ may have a ARVQ grade of 5 during time period $T_1$, and an ARVQ grade of 6 during time $T_2$. It is clear that the allocator may choose version $V_1$ during time period $T_1$, and version $V_2$ during time period $T_2$. Consequentially the video that is sent will consistently have an ARVQ grade of 6.

By proper version selection, the allocator may overcome QoE degradation due artifacts that are caused by transitioning between versions. The disclosed method proposes gradual switching between video versions that differ in quality within an acceptable level. For example, in cases where the transmission bit rate has to be lowered due to network behavior, the ARVQ received by a user device could drop from 8 to 4. The allocator may select a video version that will provide the user device with an ARVQ of 7, 6 and 5 for the duration of the transition to minimize the sharpness of the quality drop.

Version selection can also reduce start/seek times by lowering the video version for a limited period. For example: a video sequence is divided into 1 second long Switch Units and encoded to low and high bit rate versions with video bit rates 2 Mbps and 4 Mbps respectively. A user device with an available bandwidth of 4 Mbps requests the video. Assume the user device begins playback when it accumulates three seconds of video in its buffer. To minimize start time, the allocator may choose to transmit three 1 sec Switch Units from the 2 Mbps version, and the rest from the 4 Mbps version. This means that it takes 1.5 seconds to accumulate 3 seconds of playback ((2 Mb·3)/(4 Mbps)– 1.5 s).

Using version selection, bandwidth utilization can be increased and consequentially the number of simultaneous video playback sessions as well. This can be done by switching to lower bit rate video versions when quality of low versions is acceptable. For example: video version $V_1$ may have an AVRQ of 6 and a bit rate of 1 Mbps during time period $T_1$, and an AVRQ of 7 and bit rate of 2 Mbps during time $T_2$. Video version $V_2$ may have an AVRQ grade of 5 and a bit rate of 600 kbps during time period $T_1$, and an AVRQ grade of 6 and a bit rate of 800 kbps during time $T_2$.

It is clear that the allocator may choose version $V_1$ during time period $T_1$, and version $V_2$ during time period $T_2$. The quality remains constant, and the bandwidth usage was lowered by 200 Kbps to 800 Kbps, instead of rising to 2 Mbps.

Figure 4:
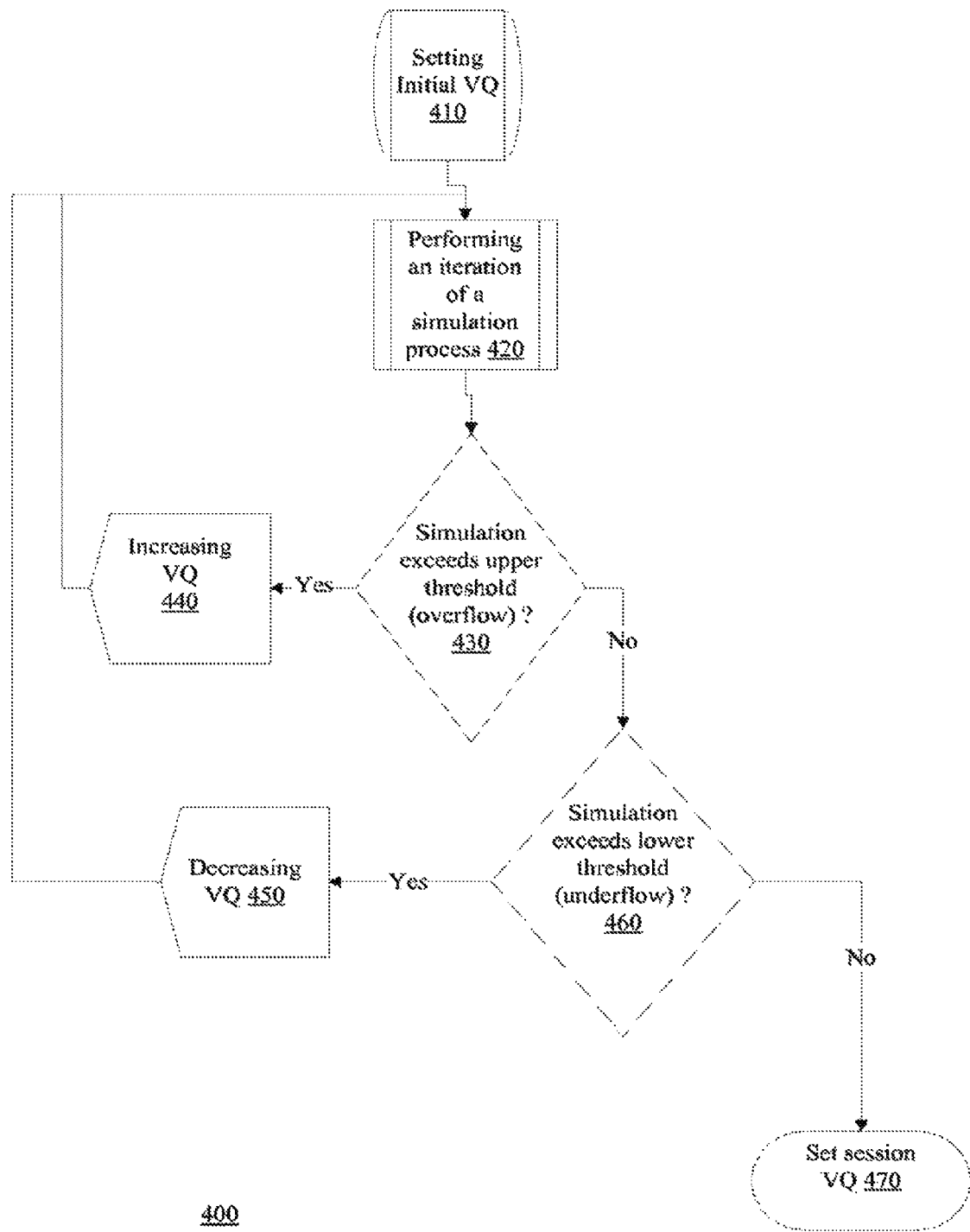
FIG. 4 illustrates a method according to an embodiment of the disclosure.

FIG. 4 illustrates a version selection process 400 according to an implementation of the disclosure. In some implementations, a version selection process 400 can be executed once every set time interval (for example 1 per second). In each iteration a VQ is chosen per session ("setting initial VQ" 410). When a user device requests a segment between two iterations, the version is selected according to the chosen VQ (output of method 400). The version selected is the one having the lowest VQ which is higher than the chosen VQ.

The method can proceed to perform an iteration of a simulation process (420) of the manner that video entities of that VQ will be provided to a user device. Stage 420 is followed by stages 430, 440, 450 and 460 which check to determine whether an overflow occurred (thus there is a need to increase VQ), whether an underflow occurred (thus there is a need to decrease VQ) and if neither occurred, the VQ is set at stage 470.

The upper threshold on the simulated PBD (overflow), marks the PBD value over which the allocator increases the target VQ. Similarly, a lower threshold on the simulated PBD (underflow), marks the PBD value under which the Allocator decreases the target VQ. The transmitted bit-rate is not affected by the changing VQ, only the sizes of the transmitted segments. Increasing the VQ causes an increase in the segment sizes, hence in a given time (and fixed transmitted size) fewer segments will be transmitted, and the simulated PBD will decrease. Similarly, decreasing the VQ will cause a decrease in segment sizes, hence in a given time, more segments will be transmitted, and the simulated PBD will increase.

The simulation process 420 can take into account the playback duration (PBD) of each session by setting it as the duration of video playback available to that session. A session whose PBD is negative will experience a "freeze", or cessation in playback. The algorithm for choosing a VQ per session relies on the assumption that the statistical multiplexing, in charge of dividing the bandwidth between the sessions, aims to equalize all the session PBDs. Following this assumption, the simulation includes estimating the PBD of each session according to the metadata of the video stream.

The outcome of stages 420-460 may be the highest VQ is found that ensures that there will be no cessation of playback (not underflow or overflow).

The simulated duration of playback available to the session's media player at time t (PBD(t)) is the current duration, plus the sum of all the segment durations that will be transmitted, given the available bit rate, during time t, which is the actual amount of time that the user device has played the video.

The amount of segments that can be transmitted up to time t depends on the segment sizes and the available bit rate. Segment sizes for the calculation are chosen according to the VQ in the simulation. For example, the following table describes the sizes in bytes of segments that need to be transmitted in a session. Each segment is 5 seconds. Assume initial playback duration is 5 seconds.

| VQ | GOP #1    | GOP #2    | GOP #3    |
|----|-----------|-----------|-----------|
| 10 | 1000 Kbits| 1000 Kbits| 1000 Kbits|
| 7  | 700 Kbits | 700 Kbits | 700 Kbits |
| 5  | 500 Kbits | 500 Kbits | 500 Kbits |

Let the available bandwidth to that user device be 500K. For a VQ=10, PBD(t=3)=5+1*5−3=7 seconds. For a VQ=7, PBD(t=3)=5+2*5−3=12 seconds. For a VQ=5, PBD (t=3)=5+3*5−3=17 seconds.

If at any time t, PBD(t) drops below a certain threshold, then VQ is decreased and the simulation starts over. If the PBD(t) rises above a certain threshold then the VQ is increased.

The lower threshold is meant to ensure that in the unfortunate case of a bit rate drop due to wi-fi problems, unexpected data on the link or any other hindrance to transmission, playback will not cease. For example, if segment lengths are 5 seconds, and the lowest bit rate is 500 Kbps, and the highest bit rate is 1000 Kbps, then a low threshold of 10 seconds is reasonable since it allows the allocator to change between the two without cessation of playback in case the bandwidth drops from 1000 Kbps to 500 Kbps $$\left(1000 \text{ Kbps} \cdot 5 \text{ seconds} = 5000 \text{ Kbits} \rightarrow \frac{5000 \text{ Kbits}}{500 \text{ Kbps}} = 10 \text{ seconds}\right).$$

Likewise, the upper threshold is meant to maximize the bandwidth utilization by denying user devices an unnecessarily long playback buffer.

Once the VQ is set for each session (SVQ), an additional simulation is done on each link that is shared by a group of sessions. This is eventually done on all links of the network that coupled the user devices to the output handler, from the closest to the user device (e.g., home gateways), to the farthest, (e.g., the common link exiting the video server to all gateways). Simulation on a group of sessions is done in a similar fashion as described above with the following changes:

PBD(t) is to be understood as the common playback buffer duration and is the sum of all playback durations of all sessions that share that link. The available bit rate is the link's estimated bit rate. The thresholds are multiplied per session. Segment sizes are chosen according to $VQ_{min}$ which is the minimum between the simulation VQ and the SVQ that was set in previous simulations.

A simulation is eventually done on all links.

Figure 5:
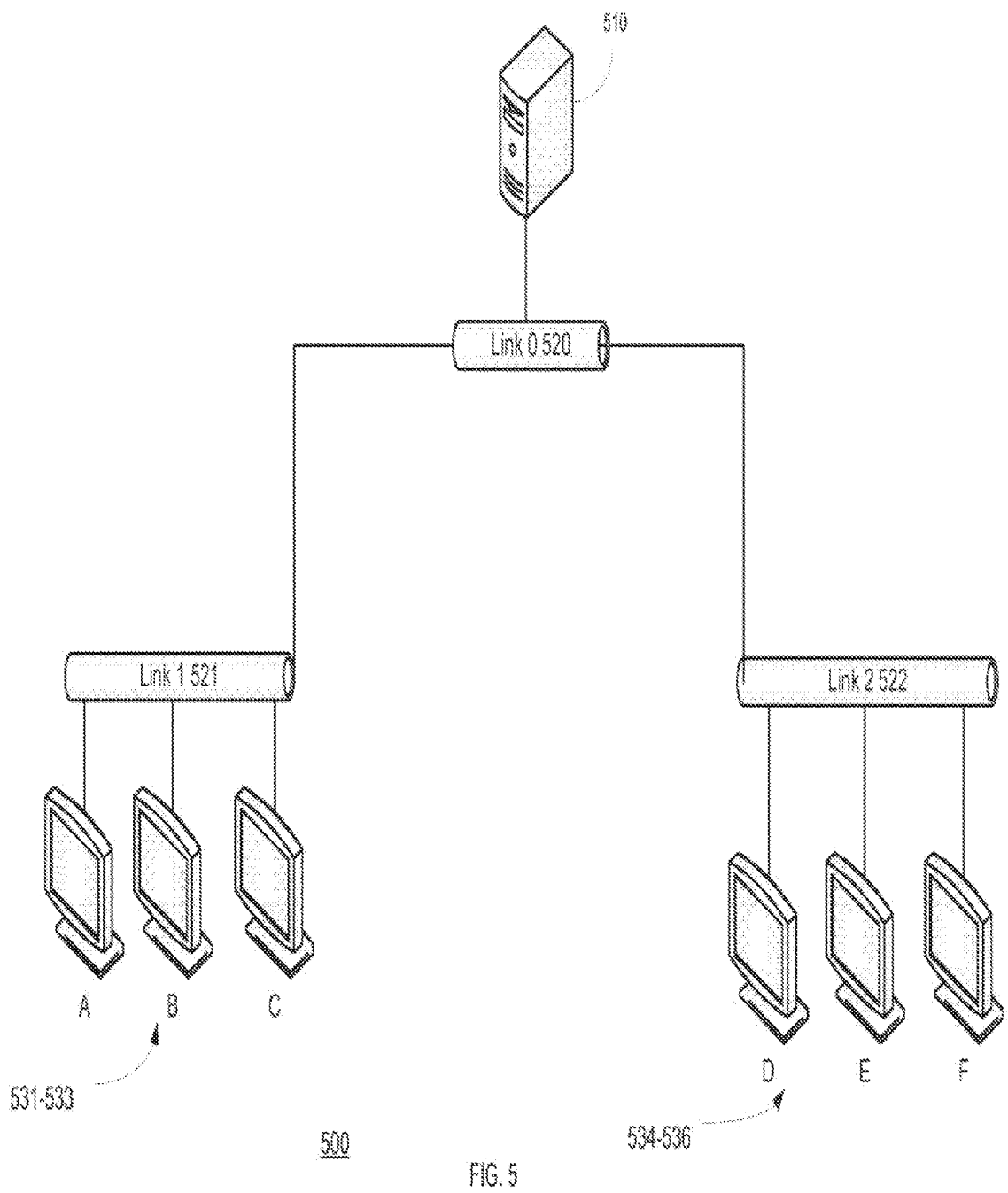
FIG. 5 illustrates an environment that is simulated during the method of FIG. 4 according to an embodiment of the disclosure.

FIG. 5 illustrates a non-limiting environment that is simulated by method 400. A server 510 (can be a part of output handler 40) is connected to linkO 520. LinkO 520 is connected to link1 521 and to link2 522. Link1 521 serves three sessions A-C 531-533. Link2 522 serves three sessions D-F 534-536.

Simulation is done for each session A-F.

Simulations yields that only session A has a SVQ of 7, due to low bandwidth.

Simulation of Link1 521 is done, allowing only a VQ of 7 to session A, and VQ=10 to the rest. After simulation, VQ is lowered to 8. It follows that sessions B and C are capped at 8 due to congestion on link1. Simulation of Link is done, there is no congestion and none of the sessions are capped (highest VQ is taken). [00170] Simulation on LinkO is done, allowing Session A no more than VQ of 7, and session B and C VQ of 8. Due to congestion on link 0-result is VQ 7, lowering B and C.

Statistical Multiplexing

As previously described, statistical multiplexing is the act of setting the transmission bit-rate of each user device. The decoupling of the transmission bit-rate from the video encoding bit-rate enables direct control of the CPB. This is an advantage over existing adaptive streaming technologies, where the transmission bit-rate is determined by the TCP congestion control mechanism, and the CPB is controlled only implicitly by Version Selection. This explicit control can provide an advantage over the existing Adaptive Bit-Rate (ABR) technology in many cases, as demonstrated in the following examples:

Equal QoE

ABR can divide the bit-rate equally between the user devices, while statistical multiplexing can divide the bit-rate in a way which provides a larger portion for user devices that require it, hence ensuring equal QoE. User devices may require extra bit-rate due to, for example: high resolution screen, where the average bit-rate of the video is higher, or a complex video scene, which causes a temporary increase in the video bit-rate.

Alleviate Link Problems

After a certain user device experiences a momentary communication failure, where the link is down, the CPB of that user device drops. When the CPB is low, the user device is in danger of freeze, in case the available bit-rate is insufficient. In existing ABR, the behavior ranges from a decrease in visual quality when the user device reacts in time to the CPB drop and selects a lower version, to a freeze, when the user device does not react in time. Using statistical multiplexing, however, enables transmission to that user device in a bit-rate which is higher than the bit-rate it would get using TCP, and accumulating playback in its CPB faster, hence escaping from the "danger zone" faster.

Improve Start/Seek Time

Typically, the user device starts playback once the first segment is fully transmitted. Hence, the allocated bit-rate during the transmission of the first segment has crucial effect on the start/seek delay. In existing ABR, this delay will be determined by the TCP congestion control. Using statistical multiplexing, this delay can be significantly shortened by allocating to the user device who just joined/seeked a bit-rate share which is larger than his fair share.

Save Bandwidth

In a scenario where the available bit-rate for a user is larger than the video encoding bit-rate, in existing ABR, the user device will continue downloading video and accumulate playback endlessly. This downloaded video is in risk of being wasted in case the user will stop playback, or seek to a different position within the movie. Using statistical multiplexing, this scenario can be avoided by monitoring the CPB and setting the bit-rate allocated for that user device to 0 when the CPB crosses a certain threshold.

To adhere to the considerations stated above, and to make sure that the version selection is done correctly, the statistical multiplexer aims to equalize the playback buffer durations of all the served sessions. The multiplexer issues a quota of bytes per session that should be sent in the coming time interval. Short time intervals allow for quick reaction to changes in bandwidth availability and session density. The quota is set according to the current playback buffer state of each session. The statistical multiplexer is presented with a list of sessions, and their associated network paths. Each link in the network path has an estimated bandwidth. The following algorithm can be used to allocate quotas:

Sort sessions according to playback buffer durations from low to high.

For session at top of list (lowest playback duration)

Allocate maximum possible quota (which should be the minimum available bandwidth of all links to that session)

Decrease quota from estimated bandwidths of all links to that session

Remove session from list

The following example illustrates this algorithm:

The following describes a tree graph with a single link with 2 gateways.

Link 0 is connected to node_O. Node_O is connected node_1 via link_1 and to node_2 via link_2. Node_1 is connected to two other nodes and supports Session A of 1500 Kbps and Session B of 1500 Kbps. Node_2 is connected to two other nodes and supports Session C of 2000 Kbps and Session D of 2000 Kbps.

Four sessions are served.

| Session Name | Link Id | Initial Playback duration | Video bit rate |
|---|---|---|---|
| A | 1 | 1 | 1500 Kbps |
| B | 1 | 2 | 1500 Kbps |
| C | 2 | 3 | 2000 Kbps |
| D | 2 | 4 | 2000 Kbps |

Let us assume that the allocation is for 100 msecs.

| Iteration # | Link 0 BW | Link 1 BW | Link 2 BW | Session List | Allocation |
|---|---|---|---|---|---|
| 0 | 400 | 200 | 300 | Session A, Session B | Session A receives min |
| 1 | 250 | 0 | 300 | Session B, Session C | Session B receives min |
| 2 | 200 | 0 | 300 | Session C, Session D | Session C receives min |
| 3 | 0 | 0 | 100 | Session D | Session D receives min |

It is clear that after 800 msecs (8 iterations of the above algorithm), A's playback buffer will be 1.26 seconds, while B's will be 1.2, and B will start receiving quota.

Over time, this method ensures that all sessions will have equal playback buffer durations.

User Device Policies

The allocator may enforce policies towards specific user devices. User devices may be specified either by the operator or by user device information that is received from the protocol of user device requests such as: user device (iPad, iPod, etc), display capabilities (screen size/bandwidth/codec), etc.

Policies include, but are not limited to, the following: Setting a minimum/maximum/bias VQ level per user device, Setting a minimum/maximum/bias transmission rate per user device and complying with priorities assigned to user devices (user devices with higher priority may receive more resources than lower priority user devices in cases of network resource saturation).

The allocator may enforce global policies according to the availability of network resources, for example by rejecting new session requests when network resources are low and the QoE of current sessions may be jeopardized by additional sessions.

The strategies described above indicate that the allocator has access to information regarding the network and user devices that it serves.

Bandwidth Detection

There are cases where the bandwidth availability cannot be configured. Such cases may include: bandwidth between home routers and the user device due to packet drops (wireless interference/collisions) and additional data sent on the transmission channels that is not controlled video.

Bandwidth Detection for a Single User Device

When the channel bandwidth to a single user device is unknown, the allocator allocates an initial bit rate $BR_{initial}$. The output stage will attempt to transmit data in this bit rate. The feedback received from the output stage includes the number of bytes that were successfully transmitted to the user device during a time interval and so the allocator can determine the bit rate F in which that data was transmitted.

If $F<BR_{initial}$ then the allocator can conclude that the available bandwidth is BW=F. If $F>=BR_{initial}$, the allocator has to probe the channel in order to detect the maximum bandwidth of the channel. It does so by allocating $BR_{new}=BR_{initial}+\Delta$.

The output stage will then attempt to transmit in the new bit rate and return feedback. This process will continue and A will be raised until $F_{new}<BR_{new}$ at which point the allocator can again conclude that the maximum bandwidth is $BW=F_{new}$.

Bandwidth Detection for Shared Channels

The problem that rises from this scenario is that it is difficult to determine which link is the bottleneck. That is, if user device A is allocated BR: and the actual bit rate received from the feedback is $F_A<B_A$, then it is uncertain whether it's because L0 has reached its capacity or L1. To determine the bottleneck, the allocator allocates the excess bytes to user device B. The new allocation would be $BR'B=BR_B+(BR_A-F_A)$. According to the feedback received from user device B ($F_1B$) it is determined where the bottleneck is: if $FB<B_B$, then L0 has reached its maximum capacity (which is $[BW_1L0=F]A_1+F_1B$), otherwise L1 has reached its maximum capacity (which is $BW_1L1=F_1$).

This approach is applicable when the changes to available bit rate are an order of magnitude slower than the ability of the allocator and output stage to respond to the changes.

Output Handling

The output processing is responsible for the actual communication with the user devices. There are provided one or more complementary approaches to the managed adaptive streaming capabilities and improvements of the transport layer communication that allow better utilization and fixing the bandwidth to the user device on a constant value, according to allocator decisions.

It can be proposed methods to enforce user device's bandwidth over TCP and improve TCP utilization.

Three basic abstraction layers in a general communication application over TCP may include application layer, TCP stack and network interface.

The application layer represents the source of data to be transmitted. It includes all data processing stages and pushes the ready data to the TCP stack for delivery. For example video data over http.

The TCP stack layer is the transport layer that assures the delivery of the data. It receives data from the application layer and guarantees it reaches the destination reliably.

The network interface layer is responsible for the actual transmission of data to the network channel. It includes the NIC, the driver and the network protocol that controls them.

The TCP stack queues data from the application layer, and passes it on to the network interface at a controlled rate, which is regulated by the TCP congestion control mechanism. This mechanism senses congestion by detecting packet losses and estimating the round-trip time (RTT) and updates the transmission rate accordingly.

If there is a wish to prevent the TCP congestion control from regulating the transmission rate on its own, and guarantee a fixed transmission rate (provided that the available bandwidth of the network channel is sufficient), any of the three layers may be modified in the following ways to achieve the desired result:

Application Layer Approaches

Time-Division Multiplexing

In this method, a user device-server link is managed by the application has only one TCP session. This method increases the utilization of the TCP layer and enforces the session bandwidth.

The data to be transmitted is pushed by the application layer into the transmit buffer of the session's TCP stack in a certain time intervals. The aggregated amount of data pushed at every interval corresponds to the required rate. The time interval between such transmissions may be either constant or variable.

A sample implementation of this method is transmitting each constant period time $\Delta T$, the following data bytes: SessionBandwidth/$\Delta T$. A feedback about the user device ability to receive this bandwidth is described below in the network sensing section.

The time period should be similar to the RTT to achieve the best result in terms of bandwidth utilization, however this method improve the utilization even if the time period is significantly different from the RTT. Higher periods of time may be used to reduce performance requirement.

Session Multiplexing

Multiple TCP sessions are opened for the same point-to-point connection. Each session would carry a different portion of the total data to be transmitted. Since each TCP session gets a fair share of the channel bandwidth on average, the number of sessions is gradually increased until the aggregated transmission rate reaches the desired value. This method also requires the application layer at the receiving side to merge the received portions in each session back in the correct order into one stream of data TCP Flavor Selection This method does not enforce bandwidth per user device, but improves overall bandwidth utilization by a smart selection of the TCP flavor (e.g., selects a different TCP congestion control mechanism per user device).

In this method the TCP flavor may be selected according to the network condition to allow better utilization, for instance: When the managed traffic shares the same channel with other TCP traffic, it is recommended to use aggressive TCP flavors that try to claim as much bandwidth as they can for themselves, such as TCP Reno and TCP New Reno.

These flavors however suffer from unfairness when low-latency and high-latency sessions share the same channel; the low-latency sessions can claim more bandwidth and reach higher throughput. When the network channel has low-capacity and high-latency (such as a satellite link), TCP Hybla is recommended.

When the channel is a high-speed high-latency network (also called a long fat network), the Binary-Increase TCP (TCP BIC) is recommended. When the network suffers from high packet loss rates, a special TCP Selective ACK (SACK) flavor is recommended. In this flavor the receiver explicitly acknowledges each packet (instead of standard cumulative ACKs), and therefore minimizes the amount of retransmissions necessary to overcome the packet loss bursts.

When the managed traffic uses a dedicated private channel, efficient flavors such as TCP Vegas can be used to maximize the throughput.

TCP Stack Layer Approaches

Capping the Congestion Window

In this method, the TCP congestion window size (commonly denoted by cwnd) is limited (per session) to a maximum value which corresponds to the desired transmission rate. This effectively controls the maximum throughput of the TCP session. In case that a network problem occurs (either congestion or channel errors), the TCP congestion control mechanism regulates throughput accordingly by reducing the congestion window. As it constantly probes the network channel for more bandwidth, the congestion window size increases and will reach the limit but it cannot exceed it.

Network Interface Layer Approaches

Traffic Shaping

This method introduces a traffic shaper which resides in the network interface and intercepts all outgoing data packets received from the TCP stack. Intercepted packets belonging to the desired connection are filtered according to the session identifiers, and delayed (or dropped) to match the required output rate.

For instance, a token bucket algorithm can be used to regulate the average output data rate. Tokens are added to the bucket at a constant rate, but the bucket can accommodate only a limited amount of tokens). Transmitted data packets are passed through the bucket, and for every byte of the packet a token is removed from the bucket. If there are not enough tokens in the bucket, the packet is buffered and delayed until the bucket regenerates enough tokens (or alternatively the packet is dropped). For TCP transmissions, the buffer size is recommended to be in the same order of magnitude as the session's bandwidth-delay product (the desired rate times the RTT).

Network Sensing

Network sensing is provided for the allocator to determine whether the data is actually transferred to each user device at the desired rate. Any method of sensing relies, by definition, on trial and observation. This can be based on either information extracted from any of the communication layers (if they are accessible) or on an external source of information. Suggested methods to estimate the actual available bandwidth:

After a successful transfer of data files, the actual output rate can be estimated by dividing the file size by the transfer time (this can be further averaged by a sliding window to increase robustness against sampling noise and jitter).

By polling the TCP stack for the amount of queued bytes in the transmission buffer, the actual output rate can be estimated by $\Delta B/\Delta T$, where $\Delta B$ is the change in the amount of queued bytes and $\Delta T$ and is time interval between polls.

If the estimated rate is less than the desired output rate, this means that the user device experiences bandwidth deficiency and the estimation approximates the actual available bandwidth. It is recommended hence to optimize the transmission to the currently available bandwidth.

However, if the estimated rate equals the desired output rate (assuming that the server enforced rate limiting), there might be potentially more available bandwidth than utilized. In this case the server can try to utilize more bandwidth by temporarily pushing data into the TCP transmission buffer at a higher rate and re-estimating the output rate.

The exact available bandwidth in the network channel can also be detected by querying intermediate network nodes (such as routers) for available bandwidth via supported management protocols. For instance, most devices support SNMP, which allows common monitoring tools, such as MRTG, to look up for specific object identifiers from the router's database and collect the necessary information.

Figure 6:
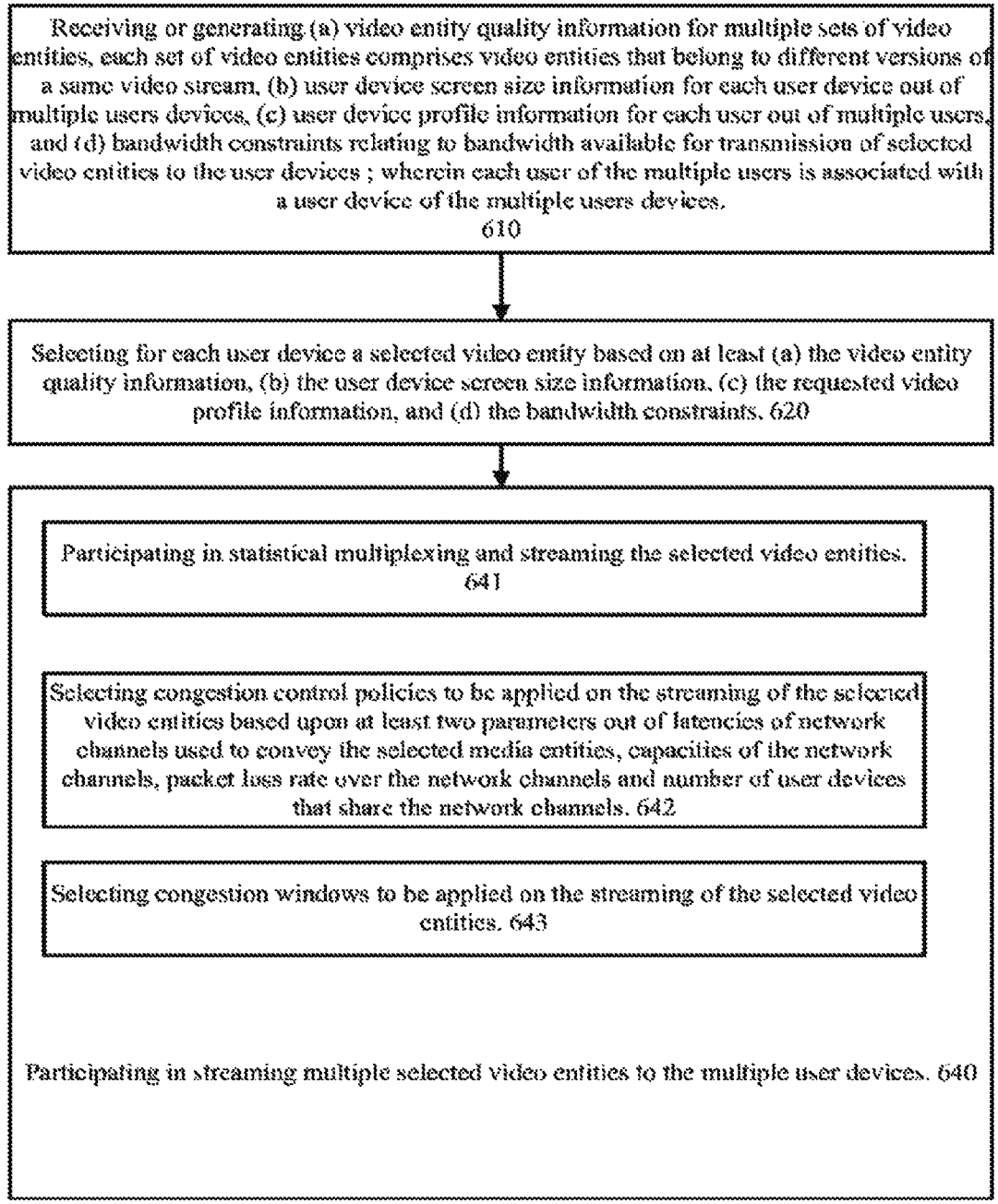
FIG. 6 illustrates a method according to an embodiment of the disclosure.

FIG. 6 illustrates process 600 according to some implementations. FIG. 7 illustrates stage 620 of process 600 according to various implementations. Process 600 can start at stage 610 by receiving or generating (a) video entity quality information for multiple sets of video entities, each set of video entities comprises video entities that belong to different versions of a same video stream, (b) user device screen size information for each user device out of multiple users devices, (c) user device profile information for each user out of multiple users, and (d) bandwidth constraints relating to bandwidth available for transmission of selected video entities to the user devices; wherein each user of the multiple users is associated with a user device of the multiple users devices. It is noted that during stage 610 each of information items (a)-(d) can be received or generated. Thus, one information item can be generated while another can be calculated.

At stage 620 a video entity is selected for each user device based on at least (a) the video entity quality information, (b) the user device screen size information, (c) the requested video profile information, and (d) the bandwidth constraints.

Stage 620 is followed by stage 640 streaming content to the multiple user devices from the multiple selected video entities.

Stage 620 can include stage 621 where a set of quality of experience factors are calculated for each combination of user device and set of video entities; wherein each quality of experience factor is responsive to (a) video entity information related to each video entity of the set, (b) user screen device information related to the user device and (c) user device profile information indicative of a video profile supported by the user device. At stage 622 the selected video entity is selected for each user device based upon a set of quality of experience factors associated with the user. At stage 623 a selected video entity for a first user of the multiple users is chosen based upon a set of quality of experience factors associated with the first user and sets of quality of experience factors associated with other users. At stage 624 the selected video entity for the first user device is chosen such as to reduce a difference between a quality of experience factor associated the selected video entity to be sent to the first user and a quality of experience factor associated with another selected video entity to be sent to another user. At stage 625 the selected video entity is chosen such as to reduce a difference between quality of experience factor associated with a selected video entity to be sent to the first user and at least one quality of experience factor associated with another selected video entity that was already sent to the first user. At stage 626 the selected video entity is chosen so as to reduce a difference between quality of experience factors associated with different video entity to be sent to the first user at different points in time. At stage 627, the quality of experience factor is calculated based on a peak signal to noise ratio (PSNR) and angular pixel density. At stage 628 a simulation is performed for (a) multiple selections iterations of selected video entities to be transmitted to the multiple of users and (b) transmissions of the selected video entities to the multiple users, during a future period of time.

At stage 629 a set of quality of experience factors is calculated for each combination of user device and set of video entities; wherein each quality of experience factor is responsive to (a) video entity information related to each video entity of the set, (b) user screen device information related to the user device and (c) user device profile information indicative of a video profile supported by the user device.

At stage 630 a quality experience factor is selected from a set of quality experience factors such as to guarantee that a user device receives selected video entities having the selected quality of experience factor without an occurrence of an overflow or an underflow during a future period of time.

At stage 631 a possibility of an occurrence of the overflow and the underflow is evaluated during the future period of time while taking into account (a) statistical multiplexing applied on selected media entities aimed to be transmitted to the multiple users and (b) estimated network constraints to exist during the future period of time.

At stage 632 quality of experience factors are selected for user devices that share a same network link based upon bandwidth constraints applicable to the network link.

At stage 641 bandwidth allocation is made to selected video streaming entities are made using statistical multiplexing.

At stage 642 the process selects congestion control policies to be applied on the streaming of the selected video entities based upon at least two parameters out of latencies of network channels used to convey the selected media entities, capacities of the network channels, packet loss rate over the network channels and number of user devices that share the network channels.

At stage 643 congestion windows are selected to be applied to the streaming of the selected video entities.

The systems, methods and computer readable media associated with streaming video servers of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for bandwidth management, the method comprising:
  generating
    (a) video entity quality information for multiple sets of video entities, each set of video entities comprises video entities that belong to different versions of a same video stream,
    (b) user device screen size information for each user device out of multiple users devices,
    (c) user device profile information for each user out of multiple users, and
    (d) bandwidth constraints relating to bandwidth available for transmission of selected video entities to the user devices;
  wherein each user of the multiple users is associated with a user device of the multiple users devices;
  selecting for each user device a selected video entity based on at least
    (a) the video entity quality information,
    (b) the user device screen size information,
    (c) the requested video profile information,
    (d) the bandwidth constraints; and
    (e) an equalization of video quality levels for content delivered to each of the multiple users; wherein the equalization comprises a selection of each respective selected video entity for each respective user device, the selection comprising:
      determining one or more video quality levels for the respective user device;
      determining a bandwidth required for delivering content at each of the one or more video quality levels determined for the respective user device;
      determining a specific video quality level at which the content may be delivered to each of the user devices without the sum of the bandwidths associated with the video quality levels for the user devices exceeding a network constraint;

calculating a set of quality of experience factors for each combination of user device and set of video entities, wherein each quality of experience factor is responsive to (a) video entity information related to each video entity of the set, (b) user screen device information related to the user device and (c) user device profile information indicative of a video profile supported by the user device;

selecting a first selected video entity for a first user of the multiple users, wherein selecting is based upon a set of quality of experience factors associated with the first user and sets of quality of experience factors associated with other users, wherein the first selected video entity is selected to reduce a difference between a quality of experience factor associated with the first selected video entity to be sent to the first user and a quality of experience factor associated with another selected video entity to be sent to another user;

thereby, resulting in each respective selected video entity being displayed at a corresponding user device at the same video quality level as the other selected video entities are displayed at corresponding user devices;

performing a simulation for (a) multiple selections iterations of selected video entities to be transmitted to the multiple of users, and (b) transmissions of the selected video entities to the multiple users, during a future period of time;

selecting a quality experience factor of a set of quality experience factors such as to guarantee that a user device receives selected video entities having the selected quality of experience factor without an occurrence of an overflow or an underflow during a future period of time;

evaluating a possibility of an occurrence of the overflow and the underflow during the future period of time while taking into account (a) statistical multiplexing applied on selected media entities aimed to be transmitted to the multiple users, and (b) estimated network constraints to exist during the future period of time; and participating in streaming multiple selected video entities to the corresponding multiple user devices, wherein bandwidth allocation is made to selected video streaming entities based upon statistical multiplexing.

2. The method of claim 1, further comprising selecting the selected video entity for each user device based upon a set of quality of experience factors associated with the user.

3. The method of claim 1, wherein the first selected video entity is selected to reduce a difference between a quality of experience factor associated with a selected video entity to be sent to the first user and at least one quality of experience factor associated with another selected video entity that was already sent to the first user.

4. The method of claim 1, wherein the first selected video entity is selected to reduce a difference between quality of experience factors associated with a different video entity to be sent to the first user at different points in time.

5. The method of claim 1, further comprising calculating the quality of experience factor based on a peak signal to noise ratio (PSNR) and angular pixel density.

6. The method of claim 1, further comprising calculating a set of quality of experience factors for each combination of user device and set of video entities; wherein each quality of experience factor is responsive to (a) video entity information related to each video entity of the set, (b) user screen device information related to the user device, and (c) user device profile information indicative of a video profile supported by the user device.

7. The method of claim 1, further comprising selecting quality of experience factors of user devices that share a same network link based upon bandwidth constraints applicable to the network link.

8. The method of claim 1, wherein participating comprises participating in statistical multiplexing and streaming the selected video entities.

9. The method of claim 1, further comprising selecting congestion control policies to be applied on the streaming of the selected video entities based upon at least two parameters, comprising: latencies of network channels used to convey the selected media entities; capacities of the network channels; packet loss rate over the network channels; and, number of user devices that share the network channels.

10. The method of claim 1, further comprising selecting congestion windows to be applied on the streaming of the selected video entities.

11. One or more non-transitory computer readable media storing instructions operable to cause a processor to:

receive or generate
  (a) video entity quality information for multiple sets of video entities, each set of video entities comprises video entities that belong to different versions of a same video stream,
  (b) user device screen size information for each user device out of multiple users devices,
  (c) user device profile information for each user out of multiple users, and
  (d) bandwidth constraints relating to bandwidth available for transmission of selected video entities to the user devices;

wherein each user of the multiple users is associated with a user device of the multiple users devices;

select for each user device a selected video entity based on at least
  (a) the video entity quality information,
  (b) the user device screen size information,
  (c) the requested video profile information,
  (d) the bandwidth constraints; and
  (e) an equalization of video quality levels for content delivered to each of the multiple users; wherein the equalization comprises a selection of each respective selected video entity for each respective user device, the selection comprising:

determining one or more video quality levels for the respective user device;
  determining a bandwidth required for delivering content at each of the one or more video quality levels determined for the respective user device;
  determining a specific video quality level at which the content may be delivered to each of the user devices without the sum of the bandwidths associated with the video quality levels for the user devices exceeding a network constraint;
  calculating a set of quality of experience factors for each combination of user device and set of video entities, wherein each quality of experience factor is responsive to: (a) video entity information related to each video entity of the set, (b) user screen device information related to the user device, and (c) user device profile information indicative of a video profile supported by the user device;

selecting a first selected video entity for a first user of the multiple users, wherein selecting is based upon a set of quality of experience factors associated with the first user and sets of quality of experience factors associated with other users, wherein the first selected video entity is selected to reduce a difference between a quality of experience factor associated with the first selected video entity to be sent to the first user and a quality of experience factor associated with another selected video entity to be sent to another user;

thereby, results in each respective selected video entity being displayed at a corresponding user device at the same video quality level as the other selected video entities are displayed at corresponding user devices;

perform a simulation for (a) multiple selections iterations of selected video entities to be transmitted to the multiple of users, and (b) transmissions of the selected video entities to the multiple users, during a future period of time;

select a quality experience factor of a set of quality experience factors such as to guarantee that a user device receives selected video entities having the selected quality of experience factor without an occurrence of an overflow or an underflow during a future period of time;

evaluate a possibility of an occurrence of the overflow and the underflow during the future period of time while taking into account (a) statistical multiplexing applied on selected media entities aimed to be transmitted to the multiple users, and (b) estimated network constraints to exist during the future period of time; and participate in streaming multiple selected video entities to the corresponding multiple user devices, wherein bandwidth allocation is made to selected video streaming entities based upon statistical multiplexing.

12. The one or more computer readable media of claim 11, further comprising storing instructions for selecting the selected video entity for each user device based upon a set of quality of experience factors associated with the user.

13. The one or more computer readable media of claim 11, further comprising storing instructions for simulating: (a) multiple selections of iterations of selected video entities to be transmitted to the multiple of users during a future period of time, and (b) transmissions of the selected video entities to the multiple users during a future period of time.

* * * * *